United States Patent [19]

Lawther

[11] Patent Number: 4,763,999

[45] Date of Patent: Aug. 16, 1988

[54] ZOOM LENS ASSEMBLY

[75] Inventor: Joel S. Lawther, Rochester, N.Y.

[73] Assignee: Eastman Kodak Company, Rochester, N.Y.

[21] Appl. No.: 2,540

[22] Filed: Jan. 12, 1987

[51] Int. Cl.4 .............................................. G02B 7/11
[52] U.S. Cl. ................................. 350/429; 354/400; 355/58
[58] Field of Search ................. 350/429, 430; 355/55, 355/56, 58; 354/195, 400, 402, 403

[56] References Cited

U.S. PATENT DOCUMENTS

| | | | |
|---|---|---|---|
| 2,975,670 | 3/1961 | Hemstreet | 350/184 |
| 3,533,344 | 10/1970 | Thomas | 350/429 |
| 3,798,660 | 3/1974 | Hasegawa et al. | 95/44 C |
| 4,012,124 | 3/1977 | Toda et al. | 350/187 |
| 4,275,952 | 6/1981 | Uesugi | 350/429 |
| 4,281,907 | 8/1981 | Kamata | 350/429 |
| 4,397,544 | 8/1983 | Yajima et al. | 355/58 |
| 4,439,018 | 3/1984 | Okajima et al. | 350/430 |
| 4,472,033 | 9/1984 | Fukuhara et al. | 350/429 |
| 4,555,165 | 11/1985 | Negoro | 350/429 |
| 4,621,906 | 11/1986 | Hashimoto et al. | 350/429 |

Primary Examiner—John K. Corbin
Assistant Examiner—Loha Ben
Attorney, Agent, or Firm—Roger A. Fields

[57] ABSTRACT

In a zoom lens assembly, an objective lens is changed in focal length by moving first and second lens groups relative to each other and is focused by moving the first lens group relative to the second lens group. A zooming cam has respective camming surfaces corresponding to the first and second lens groups for moving the first and second lens groups relative to each other to change the focal length of the objective lens. A focusing cam is operatively associated with the camming surface corresponding to the first lens group for moving the first lens group relative to the second lens group to focus the objective lens in accordance with a change in the focal length of the objective lens.

5 Claims, 2 Drawing Sheets

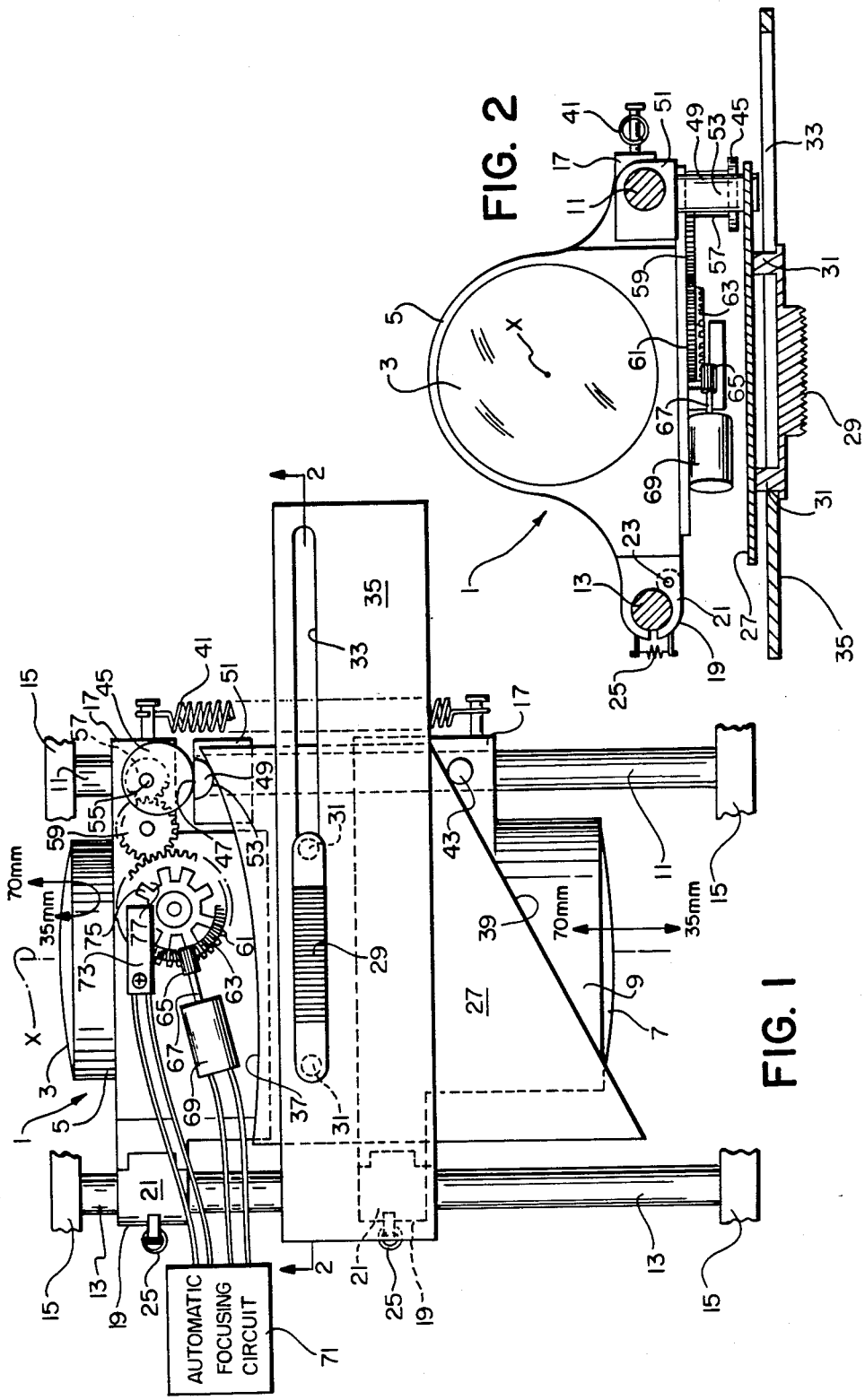

4,763,999

ZOOM LENS ASSEMBLY

BACKGROUND OF THE INVENTION

1. Field of the Invention

The invention relates generally to the field of photographic lenses having a variable focal length, commonly referred to as zoom lenses. More particularly, the invention relates to a zoom lens which is changed in focal length by moving first and second lens groups along an optical axis and is focused by moving the first lens group along the optical axis.

2. Description of the Prior Art

The basis of all zoom lenses is the fact that in a lens system consisting of positive and negative lens elements a change in the separation of the lens elements changes the focal length. This, however, alters the lens to image distance for maximum sharpness. Thus, a change in the focal length requires that the zoom lens be refocused.

Typically in many zoom lenses, the focal length is changed by moving first and second lens groups in different amounts along an optical axis and is focused by moving the first lens group relative to the second lens group along the optical axis. Examples of such an arrangement are shown in U.S. Pat. Nos. 4,275,952 granted June 30, 1981 and in 4,472,033, granted Sept. 18, 1984. In the 4,275,952, an operating ring is turned to move a first lens group along the optical axis for focusing by virtue of a helicoidal screw engagement between a lens holding frame and a lens moving frame. On the other hand, the operating ring is moved parallel to the optical axis to move the first and second lens groups in different amounts along the optical axis to change the focal length by means of the helicoid engagement and a camming device. However, this arrangement is mechanically complex and therefore expensive to manufacture.

SUMMARY OF THE INVENTION

The invention provides a zoom lens assembly which is relatively simple in construction as compared to known prior art arrangements.

According to the invention, there is provided an improved zoom lens assembly of the type wherein an objective lens is changed in focal length by moving first and second lens groups relative to each other and is focused by moving the first lens group relative to the second lens group. A zooming cam has respective cam surfaces corresponding to the first and second lens groups for moving the first and second lens groups relative to each other to change the focal length of the objective lens. A focusing cam is operatively associated with the cam surface corresponding to the first lens group for moving the first lens group relative to the second lens group to focus the objective lens in accordance with a change in the focal length of the objective lens.

BRIEF DESCRIPTION OF THE DRAWINGS

The invention will be described in connection with the drawings, wherein:

FIG. 1 is an elevation view of a zoom lens assembly according to a preferred embodiment of the invention, showing front and rear lens groups separated a relatively short predetermined distance to establish a focal length of 70 mm;

FIG. 2 is a sectional view of the zoom lens assembly as seen in the direction of the arrows from the line 2—2 in FIG. 1.

DESCRIPTION OF THE PREFERRED EMBODIMENT

Figure 3:
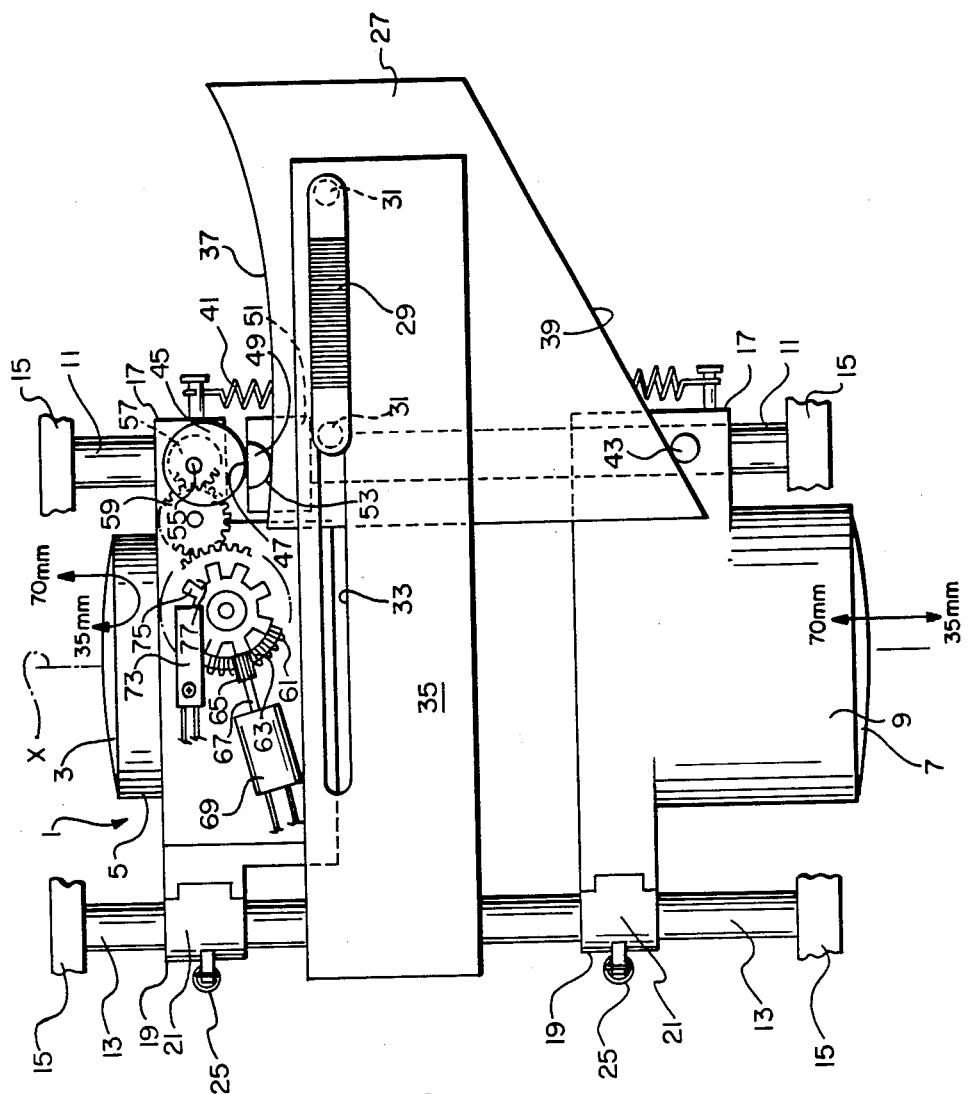
FIG. 3 is an elevation view of the zoom lens assembly, showing the front and rear lens groups separated a relatively long predetermined distance to establish a focal length of 35 mm.

The invention is disclosed as being embodied preferably in a 35 mm camera having a built-in zoom lens. Because the features of this type of camera are generally well known, the description which follows is directed in particular to photographic elements forming part of or cooperating directly with the disclosed embodiment. It is undertood, however, that other elements not specifically shown or described may take various forms known to persons of ordinary skill in the art.

Referring now to the drawings and in particular to FIGS. 1 and 2, there is shown a zoom lens assembly incorporated in a 35 mm camera. As shown, an objctive lens 1 comprises a front lens group 3 (closest to the object to be photographed) located wtihin a front lens holder 5 and a rear lens group 7 (closest to the film to be exposed) located within a rear lens holder 9. The front and rear lens holders 5 and 9 are supported for translational movement along a pair of rods 11 and 13. The two rods 11 and 13 are secured to the camera body 15 in substantially parallel relation to the optical axis X of the front and rear lens groups 3 and 7. Each of the lens holders 5 and 9 has an integral collar 17 encircling the rod 11 and a split collar 19 encircling the rod 13. The split collar 19 includes a pivotable member 21 pivotally mounted at an axial pin 23, but urged by a helical tension spring 25 against the rod 13, to accommodate any slight variations of the two rods 11 and 13 from their parallel relation.

A zooming cam plate 27 is fixed to a manually accessible, knurled grip 29 by a pair of bearings 31 which extend through a slot 33 in a mount plate 35 secured to the camera body 15. This is done to support the zooming cam plate 27 for translational movement generally transverse to the optical axis X, as shown in FIGS. 1 and 3, and to prevent movement of the cam plate in any other direction. The zooming cam plate 27 has a front camming surface 37 corresponding to the front lens group 3 and a rear camming surface 39 corresponding to the rear lens group 7. A helical tension spring 41 couples the front and rear lens holders 5 and 9 to urge a cam follower pin 43 projecting from the rear lens holder against the rear camming surface 39 and to urge a focusing cam disk 45 located on the front lens holder against a flat surface 47 of a cam follower/ base 49. The cam follower/base 49 projects from a floating block 51 slidably mounted on the rod 11 and has an arcuate surface 53 which is urged by the spring 41 against the front camming surface 37. When the zooming cam plate 27 is moved from the left, as viewed in FIG. 1, to the right, as viewed in FIG. 3, the front and rear lens holders 5 and 9 are moved in different amounts along the optical axis X to change the focal length of the objective lens 1 from 70 mm to 35 mm. Conversely, return movement of the zooming cam plate 27 changes the focal length of the objective lens 1 from 35 mm to 70 mm. The respective paths taken by the front and rear lens groups 3 and 7 to change the focal length of the objective lens are shown by the double-head arrows 35 mm–70 mm in FIG. 1.

The focusing cam disk 45 is mounted on the front lens holder 5 by an eccentric pin 55 for rotation about an eccentric axis. A coaxial gear 57 fixed to the focusing cam disk 45 engages an intermediate gear 59 which, in turn, engages a motor-driven gear 61. As shown in FIG. 1, the motor-driven gear 61 is fixed to a coaxial crown gear 63 rotated by a pinion 65 of a motor shaft 67 of a focusing motor 69. The energization of the focusing motor 69 is controlled by a conventional automatic focusing circuit 71 connected to the motor. When the focusing motor 69 is energized, the focusing cam disk 45 is rotated in contact with the flat surface 47 of the cam follower/base 49 to move the front lens holder 5 relative to the rear lens holder 9 along the optical axis X to focus the objective lens 1. The de-energization of the focusing motor 69 is controlled by a position feedback sensor 73 connected to the automatic focusing circuit 71. The feedback sensor 73 senses a series of successive, spaced conductive areas 75 separated by non-conductive areas 77 on the crown gear 63 to provide an indication to the focusing circuit 71 as to the actual position of the front lens group 3 along the optical axis X.

The invention has been described with reference to a preferred embodiment. However, it will be appreciated that variations and modifications can be effected within the ordinary skill in the art without departing from the scope of the invention. For example, the focusing cam disk 45 may be arranged in contact with the front camming surface 37 of the zooming cam plate 27, rather than in contact with the flat surface 47 of the cam follower/base 49.

I claim:

1. An improved zoom lens assembly wherein an objective lens is changed in focal length by moving first and second lens groups relative to each other and is focused by moving said first lens group relative to said second lens group, and wherein the improvement comprises:
   zooming cam means having respective camming surfaces corresponding to said first and second lens groups for moving the first and second lens groups relative to each other to change the focal length of said objective lens; and
   focusing cam means for operating off of said camming surface corresponding to said first lens group, to move the first lens group relative to said second lens group, to focus said objective lens.

2. An improved zoom lens assembly wherein an objective lens is changed in focal length by moving first and second lens groups in different amounts along an optical axis and is focused by moving said first lens group relative to said second lens group along the optical axis, and wherein the improvement comprises;
   zooming cam means having respective camming surfaces corresponding to said first and second lens groups, said camming surfaces being shaped to move the first and second lens groups in different amounts along the optical axis to change the focal length of said objective lens when said zooming cam means is moved generally transverse to the optical axis;
   means supporting said zooming cam means for movement generally transverse to the optical axis and for preventing movement of the zooming cam means generally parallel to the optical axis; and
   focusing cam means connected to said first lens group for operating off of said camming surface corresponding to the first lens group, to move said first lens group relative to said second lens group along the optical axis, to focus said objective lens.

3. An improved zoom lens assembly wherein an objective lens is changed in focal length by moving first and second lens groups in different amounts along an optical axis and is focused by moving said first lens group relative to said second lens group along the optical axis, and wherein the improvement comprises;
   spring means for urging said first and second lens groups to move in opposite directions along the optical axis;
   zooming cam means having respective camming surfaces corresponding to said first and second lens groups, said camming surfaces being shaped to move the first and second lens groups in different amounts along the optical axis in opposition to said spring means to change the focal length of said objective lens when said zooming cam means is moved generally transverse to the optical axis;
   means supporting said zooming cam means for movement generally transverse to the optical axis and for preventing movement of the zooming cam means generally parallel to the optical axis; and
   a focusing cam connected to said first lens group for rotation about an eccentric axis, said focusing cam operating off of said camming surface corresponding to the first lens group to move said first lens group relative to said second lens group along the optical axis to focus said objective lens.

4. An improved zoom lens assembly wherein an objective lens is changed in focal length by moving first and second lens groups in different amounts along an optical axis and is focused by moving said first lens group relative to said second lens group along the optical axis, and wherein the improvement comprises:
   a zooming cam plate having respective cam surfaces corresponding to said first and second lens groups;
   means supporting said cam plate for movement generally transverse to the optical axis and for preventing movement of the cam plate generally parallel to the optical axis;
   respective cam followers movable by said cam surfaces corresponding to said first and second lens groups to move the first and second lens groups in different amounts along the optical axis to change the focal length of said objective lens when said cam plate is moved generally transverse to the optical axis; and
   a focusing cam connected to said first lens group for rotation about an eccentric axis, said focusing cam being rotatable in contact with said cam follower moved by said cam surface corresponding to the first lens group to move said first lens group relative to said second lens group along the optical axis to focus said objective lens.

5. The improvement as recited in claim 4, wherein said supporting means supports said cam plate for translation between said cam followers to move the cam followers.

* * * * *